LOUISA C. LIGHT.
CULINARY STEAMER.
No. 180,139.            Patented July 25, 1876.
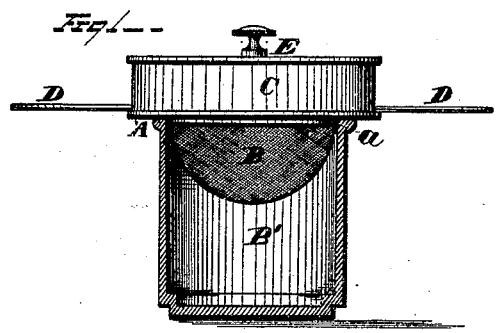
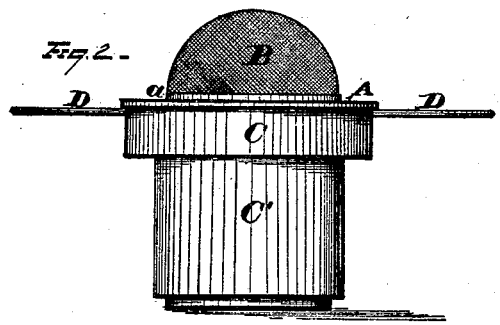
WITNESSES            INVENTOR

UNITED STATES PATENT OFFICE.

LOUISA C. LIGHT, OF LEBANON, PENNSYLVANIA, ASSIGNOR TO LOUIS S. LIGHT, OF SAME PLACE.

IMPROVEMENT IN CULINARY STEAMERS.

Specification forming part of Letters Patent No. 180,139, dated July 25, 1876; application filed June 8, 1876.

*To all whom it may concern:*

Be it known that I, LOUISA C. LIGHT, of Lebanon, in the county of Lebanon and State of Pennsylvania, have invented certain new and useful Improvements in Steamers; and I do hereby declare the following to be a full, clear, and exact description of the invention, such as will enable others skilled in the art to which it pertains to make and use it, reference being had to the accompanying drawings, which form part of this specification.

My invention relates to steamers, and has as its object an implement of domestic economy, which can be not alone utilized as in the ordinary purposes of steam cookery, but also allows of a double or multiple use, according as it may be changed in position, or some of its parts omitted from the operative process.

The construction of the article is such that, when provided with its cover and the metallic net-work is sunk in a pot or kettle, it may be used as a steamer; but when the cover is removed and the net-work is inverted over a vessel, the same fulfills the ordinary function of a perforated lid.

My invention consists in the parts and combinations hereinafter described and claimed.

In the drawings, Figure 1 is a view of my device operating as a steamer. Fig. 2 shows same as a cover.

A is the body-piece, of plane surface and circular form, having a lower encircling flange, a, either of same piece or soldered thereto in separate part, as may be desired. To this downward-projecting flange is attached a sieve, B, constructed of appropriate steel wirework, and in conformation not unlike an inverted dome. To the outer periphery of the body or main plate A is secured the circular plate C, at right angles and of proportion agreeable to the attaching parts. On either side of the structure are loops D, extending well out in a plane parallel to the main plate, and of size suitable to serve as handles for manipulating the device. E is the cover or lid, fitting down into the steamer, so as to be retained by the inclosing-wall C.

It will be seen that by the foregoing-described mechanism the uses previously given can well be performed. For instance, to effect its operation as a steamer, as shown in Fig. 1, the body-receptacle B sinks down into the open pot or other vessel B', the main plate A supporting same in position.

This vessel B' may be of any ordinary construction, and is shown in full in the drawing in order to illustrate one application of my invention; but same forms no part of the latter.

Potatoes, puddings, or any article of domestic consumption requiring such a process, are then placed therein and the lid covered over all. As the water boils, the heated globules, lighter than the retaining fluid, of a natural tendency arise as steam, and, passing up through the perforated bottom, thoroughly subject to their heated treatment whatever articles may therein be presented. If, however, it is desirable to employ the device as a cover or lid in itself to dishes which require a guard, and yet should not be shut off from fresh and outer air, then, and in such instance, the lid E is laid aside and the device inverted over the dish or pot C', which latter may be any ordinary vessel, and the construction of same does not affect my invention. The part C now acts as an outer inclosing-flange to surround the top of such vessel, protecting in full from any entrance, while the sieve-work B now assumes a dome position. Insects, flies, &c., are thus prevented from attacks upon the covered preserves or other article over which my improvement is placed.

It is evident that as a strainer or sieve proper (the device may further be used in straining sugar, separating seeds from fruit, &c.) it is very applicable; and while I preferably construct the parts of tin, with the exception of the steel wire-gauze work, and the brass handles, yet I do not restrict myself to such metal, but may independently use any and all appropriate material.

Two small pieces of tin or other metal, each about half an inch broad, may be bound in intersecting lines about the wire-cloth supporting same, and passing under its central point as their line of intersection.

Having fully described my invention, what I claim as new, and desire to secure by Letters Patent, is—

1. The combined culinary implement herein described, consisting of a perforated receptacle secured to the inner edge of the body-piece A, in combination with the outer incasing-flange C and horizontal handles D, extending well out on either side of same, substantially as and for the purpose described.

2. In a culinary implement, the combination, with the concavo-convex metallic network and supporting-plate extended out from same, of the vertical flange, forming with said plate a free full chamber provided with a close-fitting cover, substantially as and for the purpose described.

In testimony that I claim the foregoing I have hereunto set my hand this 29th day of May, 1876.

LOUISA C. LIGHT.

Witnesses:
  T. T. WORTH,
  TOBIAS REINOEHL.